MAGNETIC HEAD MOUNT

Filed April 20, 1961

RICHARD A. STOVER
INVENTOR

BY Sughrue, Rothwell, Mion & Zinn
ATTORNEYS 3,047,866
Patented July 31, 1962

3,047,866

MAGNETIC HEAD MOUNT

Richard A. Stover, Perkinsville, Vt., assignor to Vermont Research Corporation

Filed Apr. 20, 1961, Ser. No. 104,465
5 Claims. (Cl. 346—74)

This invention relates to improvements in a mounting assembly for a magnetic transducer head, and more particularly to a fine adjustment means for positioning a magnetic head relative to a recording medium surface combined with a positive stop that prevents inadvertent contact between the head and surface during further adjustment.

In the art of data processing and the like, magnetic record media such as drums and discs are commonly utilized for the storage and retrieval of data. The adjustment of a magnetic transducer head relative to the surface of the record medium, such as a drum, is quite important to the quality and uniformity of the magnetic recording operations. Various means are known for adjusting a magnetic head by a screw or the like to adjustably position the head relative to the recording surface. In such arrangements, it is extremely desirable to provide for adjusting in as fine increments as possible to quite accurately control the head to recording surface spacing. It is the object of this invention to provide such fine adjustment utilizing a geometrical advantage and a unique arrangement of a fine adjustment screw.

Magnetic heads are commonly adjustably positioned relative to a recording surface while the recording surface is moving, for adjusting operating performance. Actual contact between a fast moving recording surface and the head is highly detrimental if not ruinous. Therefore, it is essential that the head not contact the moving recording surface during such adjustment. It is a further object of this invention to provide a positive stop in the nature of a shim which will prevent the head from being adjusted to a position where it would contact the moving recording surface during trimming adjustment or the like.

A better understanding of the invention together with further objects and advantages thereof will be further understood from a consideration of the following description taken in connection with the accompanying drawings.

Figures 2, 3:
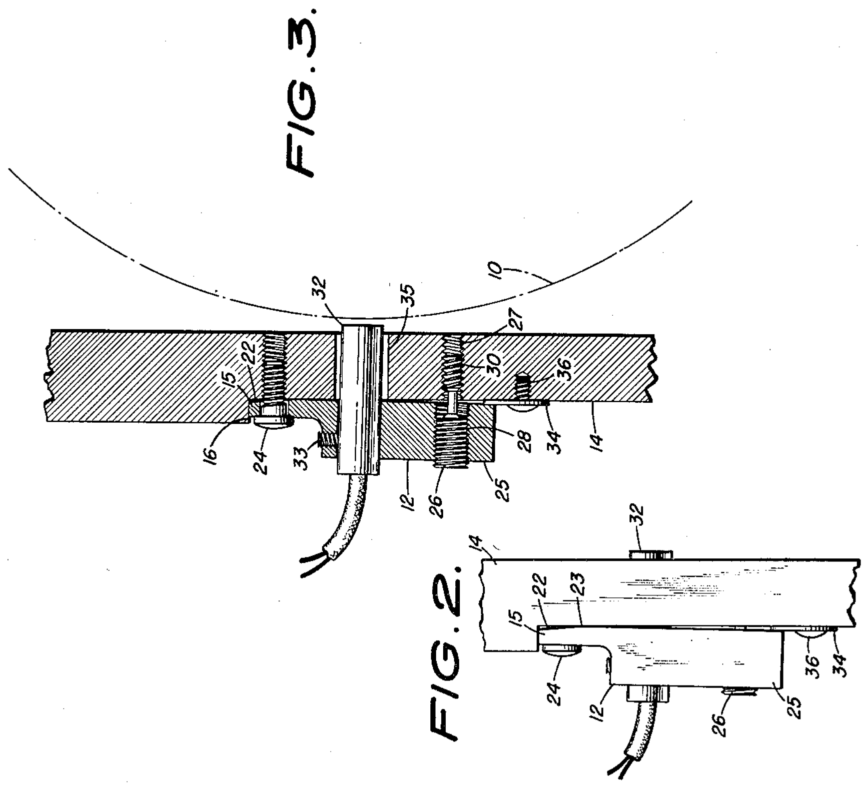
FIG. 2 is a side elevation view of the head mount assembly and support.
FIG. 3 is a sectional elevation view taken along line 3—3 of FIG. 1 showing the improved adjustable head mounting assembly of this invention as it is attached to a support housing adjacent a magnetic drum recording surface.

Generally, this invention contemplates a magnetic head mount provided with extremely fine adjustment and a positive stop. A magnetic head mount element firmly holds a magnetic transducer to be adjusted. The head mount element is attached at both ends to a support housing and is undercut at one end forming a dihedral angle from a line of flexure so that by moving this end down, the undercut portion causes the other end of the mount to move up, moving the head away from the recording surface. The end of the mount which tends to move up contains an adjustment screw having differential threads in the mount and support housing for adjustably positioning the head relative to the surface. Since the head is carried by the mount closer to the line of flexure than the differential adjustment screw, any adjustments by the screw creates a geometrical advantage in that the head is not adjusted as much as the screw adjusts the outer end of the mount, thus further contributing to fine adjustment. Between the bottom of the mount and the housing at the end of the mount which tends to move away from the housing, a shim may be inserted and fastened to the drum housing. This shim will prevent adjustment of the head mount and the head closer than a predetermined distance, as determined by the thickness of the shim, from the drum surface. This arrangement allows precise adjustment of high resolution for "trimming" the performance of any one of a plurality of magnetic heads during operating conditions without the possibility of head to drum contact.

Referring specifically to the drawing, a magnetizable recording surface 10 of a magnetic drum or the like carries magnetic data as is well known in the art. A head mount element 12 is secured to a drum housing or shroud 14. One end, 15, of the head mount element 12 abuts against an alignment rail 16 formed in the drum housing 14 for alignment and reference purposes.

Figure 1:
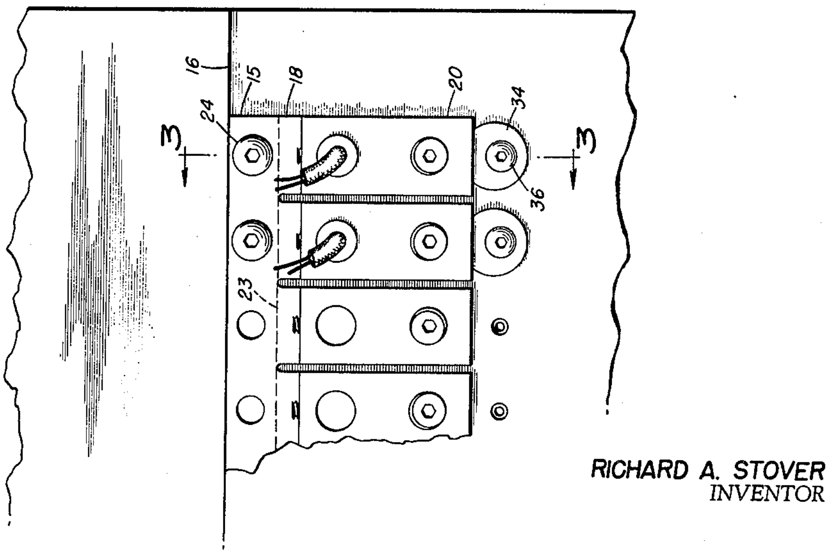
FIG. 1 is a plan view of the adjustable head assembly of this invention and a portion of the support housing.

The head mount 12 is formed of an elongated strap section 18 and a plurality of finger sections 20 as shown in FIG. 3. The strap section 18 includes an undercut portion 22 which is undercut from a suitable line of undercut 23 in order to provide a dihedral angle. A screw 24 is provided for fastening the strap section 18 of the head mount 12 with the undercut portion 22 flush with the surface of the drum housing 14, thus causing the outer end 25 of the head mount 12 to move away from the housing 14. The head mount 12 is capable of flexure about a flexure line generally in the position of the line of undercut 23 and the inner ends of the finger sections, FIG. 1.

In the drum housing, there is a threaded hole 27 for receiving a differential adjustment screw 26, FIG. 3. This differentially threaded adjustment screw contains at upper portion 28 threads of one pitch cooperating with threads in the head mount 12 and a lower section 30 with threads of a different pitch cooperating with the threaded hole 27 in the drum housing 14. The difference in the pitch of these threads allows for differential adjustment upon rotating the screw 26.

A recording head 32 of conventional construction is rigidly carried within the head mount 12 and may be secured thereto by a suitable set screw 33. The head 32 extends through a hole 35 in the drum housing 14.

While tightening screw 24 secures the end 14 of head mount 12 and causes the other end 25 of the head mount to move away from the drum housing 14, tightening of differential adjustment screw 26 causes end 25 of the head mount to move toward the drum housing 14 flexing the mount 12 about its line of flexure 23. Thus, the magnetic head 32 is adjustable relative to the drum surface 10. To prevent the end of the recording head 32 from contacting the drum surface, a safety shim 34 of suitable thickness may be positioned under the finger section 20 of the head mount 12 and it may be fastened to the drum housing 14 by suitable fastener 36.

In the operation of adjustment, both preliminary and then final, the strap section 18 of the head mount 12 is tightened down so that the undercut portion 22 is in contact with the drum housing 14 and the finger portion 20 extends outwardly. The differential adjustment screw 26 is tightened down so that the mount 18 flexes about its line of flexure 23 until the entire underside of the mount is in contact with the drum housing 14. Then the recording head 32 is inserted until it abuts surface 10 and fastened by set screw 33 or other suitable means. This fastening and clamping of the head 32 is accomplished while the drum is stationary and the head contacts the surface of the drum for initial reference positioning. Then the differential screw 26 is backed off a suitable distance to effect a separation between the end of the magnetic head 32 and the recording surface 10 of the drum. Since the distance from the differential screw 26 to the flexure line 23 is greater than the distance between the magnetic head 32 and the flexure line 23, and also because the screw itself has differential threads for fine adjustment, a very precise setting of the head 32 can be made with a relatively large angle of rotation of the adjusting screw 26. With the head mount 12 in the retracted position, spacing the head 32 from the recording surface 10, the shim 34 of predetermined thickness is inserted under the finger portion 20 of the mount and fastened to the drum housing 14. In further precise adjustments for high resolution trimming of a multitude of heads (which commonly have slight performance differences) with the drum rotating, the shim prevent inadvertent adjustment of the head closer than the predetermined distance to the drum surface, thus precluding the possibility of head to drum contact.

While there have been shown and described and pointed out the fundamental novel features of the invention as applied to the disclosed preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

I claim:

1. An adjustable mount for adjustably positioning a magnetic transducer carried by said mount relative to the surface of a record medium, the mount comprising; a record medium housing and mount support, a transducer head mount element adapted to rigidly carry a magnetic transducer, the head mount element capable of flexure along a line of flexure intermediate its ends, means securing one end of said head mount element to said support, screw means adjustably connecting the other end of said head mount element to said support, said transducer being carried by said head mount element between the screw means and the line of flexure.

2. An adjustable mount as defined in claim 1 further comprising, safety shim means positionable between the head mount element and the support to prevent the head being adjusted by said screw means closer than a predetermined distance from the surface of the record medium.

3. In a magnetic drum storage apparatus having a rotatable magnetic drum, a housing therefor, and a plurality of magnetic transducer heads, an adjustable mounting assembly for said heads comprising, a head mount element capable of flexure carrying at least one transducer head intermediate its ends, means for securing the head mount element adjacent one of its ends to the drum housing, the other end of said head mount element tending to move away from said housing, adjustable means connecting the other end of the head mount element to the housing at a position on the head mount element outboard of the transducer head so that adjustment of said adjustable means to move said head closer relative to said drum oppose said tendency of said head mount to move away from said housing and cause some flexure of said head mount element, and shim means positionable between said head mount element and said housing for preventing said head from contacting said drum during adjustment of said adjustable means.

4. An adjustable mounting assembly for mounting a magnetic transducer head an adjustably predetermined distance from the surface of a recording medium and preventing the head from being adjusted to the point where the head contacts the surface of the recording medium while moving, the mounting assembly comprising; a transducer head mount element capable of flexure, a magnetic transducer head rigidly carried intermediate the ends of the head mount element, a support housing for supporting the head mount element to adjustably position the transducer head at a variable distance from the surface of the recording medium while preventing any lateral movement of the head, an undercut portion of the head mount element adjacent one end thereof on a side supported by the support housing, means for securing the undercut end of the head mount element to the support housing, differentially threaded screw means connecting the other end of the head mount element to the support housing to cause the head mount element to flex when tightened to move this end of the support element relative to the support housing, and a shim element positionable between the end of the head mount element containing the differential threaded screw means and the drum housing for positively preventing the differential threaded screw means to allow the transducer head to contact a surface of a recording medium.

5. An adjustable mounting assembly for mounting a magnetic head an adjustable and predetermined distance from the surface of a recording medium and preventing inadvertent contact of the head and recording surface, the mounting assembly comprising; a head mount element capable of flexure including a strap portion and a plurality of finger portions extending therefrom, the strap portion being undercut to provide a dihedral angle on the undersurface thereof, a magnetic transducer head rigidly carried intermediate the ends of the head mount element in a finger portion thereof, the head mount element being flexible along a line of flexure, a support housing containing an abutment rail against which the strap portion abuts for reference aligning of the head mount, screw means extending through the strap portion of the head mount and the finger portion at opposite ends of the head mount to connect the head mount to the support housing and cause the head mount to flex about its line of flexure, the screw means extending through the finger portion of the head mount containing differential threads for fine adjustment, a shim positioned between the finger portion of the head mount and the support housing to prevent the head from being adjusted closer than a predetermined distance to the recording surface, and means for securing the shim to the support housing.

References Cited in the file of this patent

UNITED STATES PATENTS

| | | |
|---|---|---|
| 2,961,494 | Darou et al. | Nov. 22, 1960 |
| 2,986,607 | Jacobs et al. | May 30, 1961 |